United States Patent [19]
Clay

[11] 3,895,735
[45] July 22, 1975

[54] VESSEL WITH PRE-COMPRESSED SEAL
[75] Inventor: Henry J. Clay, Houston, Tex.
[73] Assignee: Hahn & Clay, Tex.
[22] Filed: July 8, 1974
[21] Appl. No.: 486,305

[52] U.S. Cl. ................................ 220/5 A; 220/315
[51] Int. Cl. ............................................. B65d 7/02
[58] Field of Search ............ 220/5 A, 81, 253, 315, 220/323, 324, 327

[56] References Cited
UNITED STATES PATENTS
2,797,948  7/1957  Tangard .......................... 220/315 X
3,372,828  3/1968  Pechacek et al .................... 220/5 A Primary Examiner—William I. Price
Assistant Examiner—Steven M. Pollard
Attorney, Agent, or Firm—Pravel & Wilson

[57] ABSTRACT

A vessel including first and second vessel sections connected by pin-type connectors which pre-compress the annular seal ring positioned between the sections.

8 Claims, 3 Drawing Figures

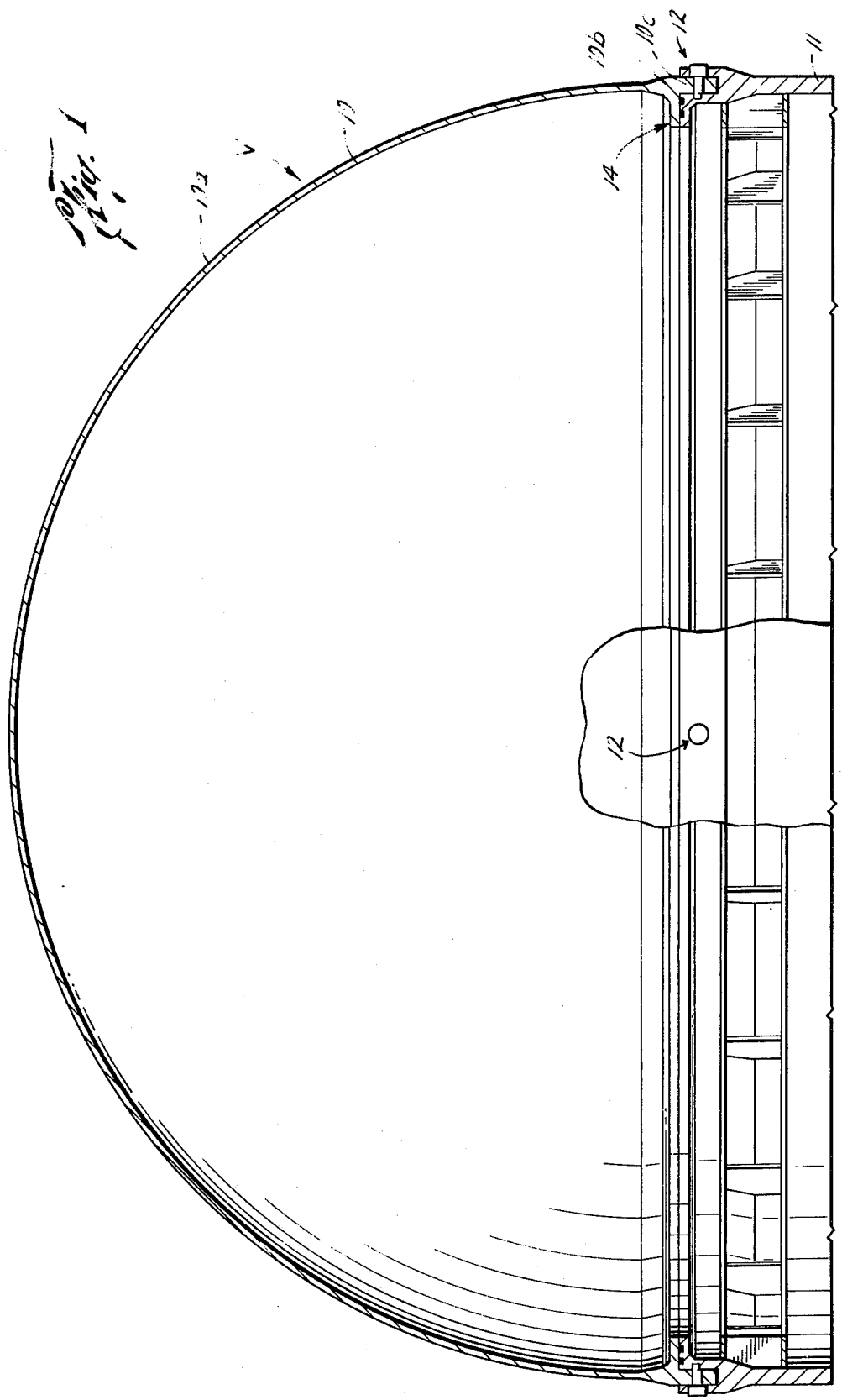

VESSEL WITH PRE-COMPRESSED SEAL

BACKGROUND OF THE INVENTION

The field of this invention is vessel structures for operation at high temperatures or high pressures or under other extreme conditions.

Pressure vessels utilizing pin-type connectors to connect the vessel head and shell are known in the art. For example, U.S. Pat. No. 3,372,828, issued to Pechacek, discloses a pin-type connection where pins are radially inserted in radially aligned holes in interlocking annular fingers located on the end portions of the vessel shell and head. Generally, such vessel connectors will also include some type of seal means such as a seal ring. In the nuclear industry, it is presently necessary to use double seal rings as a safety factor against failure. When large seal rings or gaskets are used, it is often necessary to pre-compress the seal rings so that the seal rings will properly seal under vessel pressure. Since many vessels are either mounted horizontally or are too light, even when vertical positioned, to compress the seal rings, it has been necessary to use external forces to press the head against the shell with sufficient force to pre-compress the seal rings. Such external devices, which may be hydraulic, mechanical or pneumatic, may be both expensive in cost and require constant maintenance.

SUMMARY OF THE INVENTION

This invention relates to a new and improved vessel structure which includes a first vessel section having an annular end portion formed of inner and outer concentric connector rings which are radially separated to form an annular recess. A second vessel section is also provided and includes an annular end portion having a connector ring for insertion into the annular recess of the first vessel section. Seal means are mounted with the annular end portions of the first and second vessel sections for sealing therebetween. And, the connector rings receive radially directed, circumferentially spaced pins which cooperate with the connector rings to provide a pre-load means for locking the connector rings together and for pre-compressing the seal means. The radially directed pins of the preferred embodiment of this invention are mounted for rotation with respect to the connector rings of the first and second vessel sections for providing the pre-load means for locking the connector rings in pre-compression.

BRIEF DESCRIPTION OF THE DRAWINGS

FIG. 1 is a side view, partly in section, of the vessel assembly of the preferred embodiment of this invention.

DESCRIPTION OF THE PREFERRED EMBODIMENT

Figure 3:
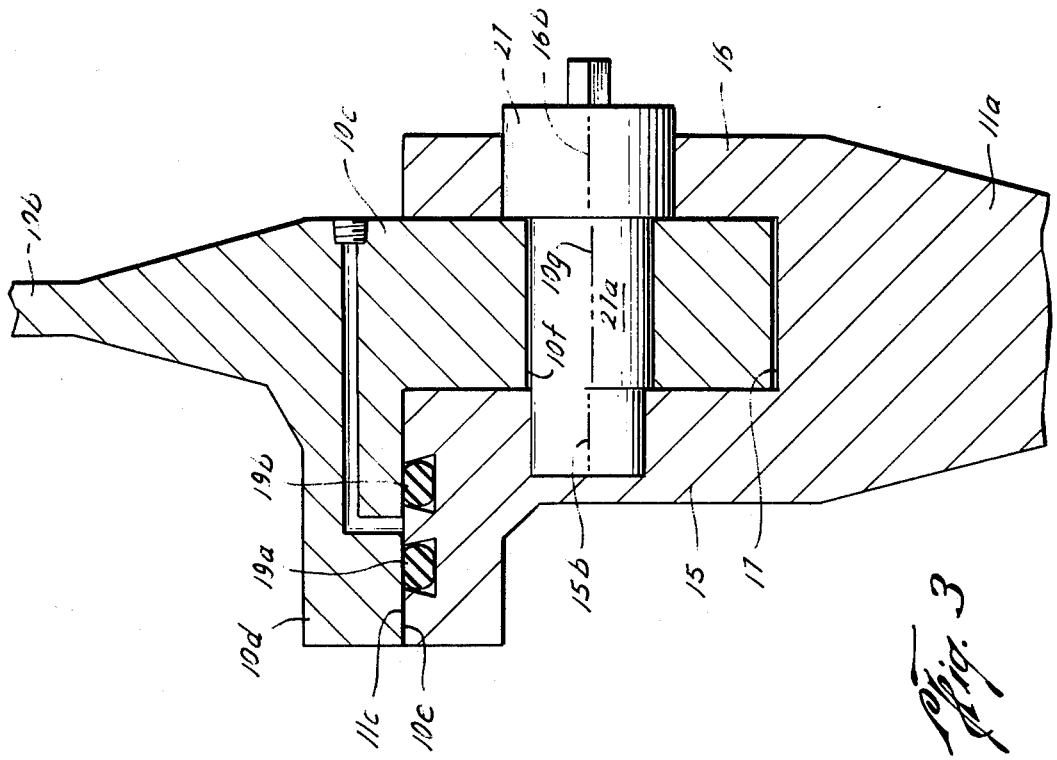
FIG. 3 is an exploded, side view partly in section of the connector means in a final, locked position for pre-compressing the seal rings.

Referring to the drawings, the letter V generally designates the vessel of the preferred embodiment of this invention. The vessel V includes a head 10 which is connected to a shell 11 by means of a connector means generally designated as 12. The connector means 12 is provided for joining the vessel head 10 and vessel shell 11 in locking engagement and for pre-compressing or pre-loading internal, annular seal means generally designated as 14.

The vessel head 10 may be of any suitable configuration. In the embodiment of the invention illustrated in FIG. 1, the main vessel head portion 10a is hemispherical in shape and includes an annular end portion 10b which terminates in an annular connector ring 10c. The annular end portion 10b may be welded or otherwise mounted with the main head portion 10a. The annular end portion 10b further includes an internal, annular end portion 10d having a downwardly facing, annular rim face 10e. The rim face 10e is directed in a radial plane with respect to the various radii utilized to generate the cylindrical shell 11 and the hemispherically-shaped main head portion 10a.

The shell 11 includes annular shell end portion 11a which is welded or otherwise attached to the main shell portion (not shown). The annular shell end portion 11a includes inner and outer concentric connector rings 15 and 16 which are radially spaced to provide annular mounting groove or recess 17 therebetween. The width of the annular groove 17 is sufficient to receive the annular connector ring 10c of the vessel head 10. Although the thickness for the head connector ring 10c is illustrated as being almost equal to the thickness of the groove 17, it should be understood that a clearance may be provided between the connector ring 10c and either of the shell connector rings 15 and 16 in order to allow for radial expansion and contraction.

The shell annular end portion 11a further includes an internal, annular rim portion or ledge 11b which includes an annular, radially directed upper face 11c. Whenever the shell connector ring 10c is mounted in the annular groove 17, the radially directed rim faces 10e and 11c oppose each other.

The internal seal means 14 includes two, radially spaced seal rings 19a and 19b which are mounted in grooves 20a and 20b machined into the upper shell rim face 11c. The seal rings 19a and 19b are annular in configuration, as are the mounting grooves 20a and 20b, and are positioned to engage the downwardly facing face 10e of the internal head rim portion 10d.

A L-shaped passageway 21 is drilled into the annular head end portion 10c to provide communication with the outside of the head 10 and the annular space 22 between the seal rings 18 and 19. In this manner, when the head connector ring 10c is in a locked position, and the seal rings 19a and 19b sealably engage the head annular rim face 10e, the passageway 21 can be utilized to test the effectiveness of the seals 19a and 19b, thereby preventing unexpected seal failure.

However, the utilization of two seal rings 19a and 19b causes some difficulties. The vessels V are generally quite large, and thus the annular seal rings 19a and 19b are also very large and thus require rather large forces to initially, effectively deform the seal rings 19a and 19b. It is necessary, as is known in the art, to initially deform the seal rings 19a and 19b sufficiently so that the seal rings 19a and 19b will operate to effectively prevent the passage of fluid between the radially opposing faces 10e and 11c when the vessel is in use.

The connector means 12 is a pin-type connector provided for joining together the head 10 and shell 11 and includes pre-load means 25 for pre-compressing or pre-loading the seal rings 19a and 19b sufficiently to cause such seal rings to operate effectively under vessel pressure. The pre-load means 25 includes a plurality of circumferentially spaced sets 26 of openings in the shell connector rings 15 and 16 and in the head connector ring 10c, which openings are aligned to receive the pins 27.

Figure 2:
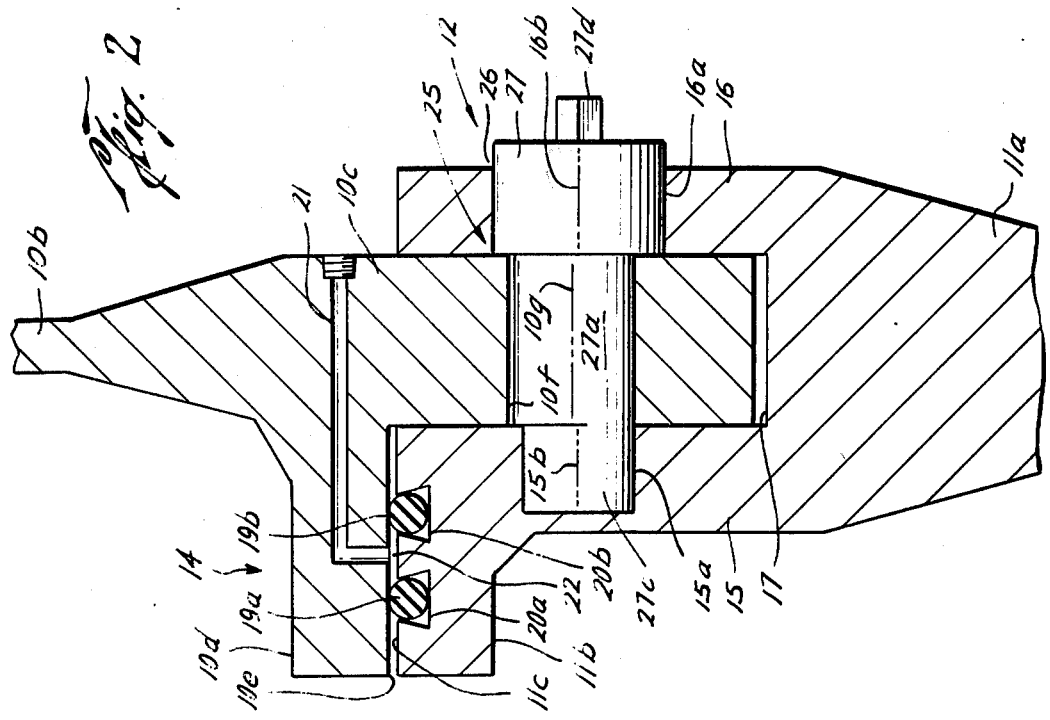
FIG. 2 is an enlarged side view in section of the vessel connector means of this invention in an initial, position.

Referring in particular to FIGS. 2 and 3 wherein one of the pin-type connector means 12 is illustrated, the outer shell connector ring 16 includes circular opening 16a having a center line 16b. The circular opening 16a is aligned with a circular opening or recess 15a in the inner shell concentric ring 15. Thus, the circular opening or recess 15a has center line 15b which is directly aligned with center line 16b of outer ring opening 16a.

The head connector ring 10c includes an opening 10f which is circular in configuration and is defined by center line 10g.

After the vessel head 10 has been placed onto the vessel shell 11 and the head connector ring 10c is initially inserted into the annular shell groove 17, the opening 10f is positioned slightly out of alignment with the openings 16a and 15a. Referring in particular to FIG. 2, where the concentric ring is illustrated in an initial, unlocked position within the groove 17, the seal rings 19a and 19b are not compressed. And, in this initially unlocked position for the head connector ring 16c, as illustrated in FIG. 2, the connector ring opening 10f is out of alignment with the shell connector ring openings 15a and 16a. Thus, the center line 10g of the head connector ring opening 10f is out of alignment with the shell connector ring opening center lines 15a and 16a.

The pin 27 is mounted in the openings 16a, 10f and 15a with the head connector ring 10c in the initial, unlocked position of FIG. 2. The pin 27 is mounted for rotation within the openings 16a, 10f and 15a and includes an eccentric or cam portion 27a for moving the connector ring 10c for vessel head 10 to the final, locked position of FIG. 3 wherein the seal rings 19a and 19b are pre-compressed or pre-loaded.

The pin 27 further includes outer pin portion 27b and inner pin portion 27c. The outer pin portion 27c is cylindrical and has substantially the same center line as does the outer concentric ring opening 16a. A hexagonally shaped nut portion 27d is mounted onto the outer pin portion 27b for receiving a suitable tool such as a wrench for rotating the entire pin 27. The eccentric pin portion 27a is also circular in configuration but has a center line which is offset from the center line 16b, thus making the eccentric portion mounted eccentrically with respect to the center line of rotation for the entire pin, which is also 16b. The inner end portion 27c of the pin has a common center line with the opening or recess center line 15d. In this manner, the pin is mounted for rotation with respect to each of the concentric ring portions 16, 10c and 15, both on head 10 and shell 11. Further, the eccentric portion 27a is capable of displacing or moving the head concentric ring 10c deeper into the groove 17 upon rotation of the pin 27 approximately 180° to the position of FIG. 3. And, it is this downward movement of the head connector ring 10c further into the annular shell groove 17, which causes the radial head face 10e to move downwardly into engagement with the shell rim face 11c thereby pre-compressing the seals 19a and 19b. It is noted that in the locked position of FIG. 3, wherein the head pin is locked into connection with the shell 11, and the seal rings 19a and 19b are pre-compressed, the center line 10g of the connector ring opening 10f is now aligned with the center lines 16b and 15b for the concentric shell rings 16 and 15, respectively.

The foregoing disclosure and description of the invention are illustrative and explanatory thereof, and various changes in the size, shape, and materials as well as in the details of the illustrated construction may be made without departing from the spirit of the invention. It should be understood that the actual configuration of the head 10 may vary from the hemispherical shape disclosed in the embodiment described herein. Further, the number of circumferentially spaced pins 27 mounted in circumferentially spaced set 26 of holes in the vessel and shell concentric rings may vary according to design.

I claim:

1. A new and improved vessel structure, including:
   a first vessel section having an annular end portion formed of inner and outer, concentric connector rings separated to form an annular recess;
   a second vessel section having an annular end portion including a connector ring for insertion into said annular recess of said first vessel section;
   seal means mounted with said annular end portions of said first and second vessel sections for sealing said first and second vessel sections against the passage of fluid therebetween; and
   said connector rings receiving a radially directed pin mounted for rotation with respect to said connector rings and including pre-load means for locking said connector rings together and for pre-compressing said seal means.

2. The structure set forth in claim 1, including:
   said inner and outer connector rings of said first vessel section having radially aligned openings therein for receiving said pin; and
   said second vessel section connector ring having an opening which is initially out of alignment with said first vessel connector ring openings; and
   said pin being mounted in said connector ring openings and including eccentric means for moving said second vessel section connector ring opening into closer alignment with said first vessel section connector ring opening for pre-compressing said seal means.

3. The structure set forth in claim 1, including:
   a pin mounted with said connector rings for rotation with respect thereto; and
   said pin including cam means mounted with said second vessel section connector ring for moving said second vessel section from an unlocked to a locked position in which said seal means is pre-compressed.

4. The structure set forth in claim 3, wherein:
   said cam means of said pin includes an eccentric portion mounted in said second vessel section connector ring for rotation between an unlocked and locked position.

5. The structure set forth in claim 2, wherein:
   said eccentric means includes a portion of said pin which is eccentrically positioned with respect to pin portions mounted in said first vessel section connector ring openings, said eccentric pin portion being mounted in said second vessel section connector ring opening for rotation between locked and unlocked portions, said seal means being pre-compressed in said locked position.

6. The structure set forth in claim 1, including:
said seal means including a seal ring mounted with one of said annular end portions of said first and second vessel sections;
said first and second connector rings having a plurality of circumferentially spaced set of openings, wherein each set of openings includes:
radially aligned openings in said connector rings of said first vessel section;
said second vessel section connector ring having an opening which is initially non-aligned with said first vessel section connector ring openings; and
said pin including cam means for moving said first vessel section to a locked position in which said seal ring is pre-compressed.

7. The structure set forth in claim 1, including:
said second vessel section connector ring being seated in said annular groove in a first position in which said seal means is not in compression; and
said pre-load means moving said second vessel section connector ring to a second position further seated in said annular groove, in which position said seal means is pre-compressed.

8. The structure set forth in claim 1, including:
said vessel section end portions including opposing annular radial faces, said seal means including an annular seal ring mounted with one of said radial faces; and
said pre-load means including means moving said annular seal ring on said one radial face and said other radial face into initial, pre-compressed engagement.

* * * * *